(12) United States Patent
Ji et al.

(10) Patent No.: US 9,521,216 B2
(45) Date of Patent: Dec. 13, 2016

(54) CONTROL PLANE FOR SENSOR COMMUNICATION

(71) Applicant: AT&T INTELLECTUAL PROPERTY I, L.P., Atlanta, GA (US)

(72) Inventors: Lusheng Ji, Randolph, NJ (US); Robert R. Miller, II, Convent Stn., NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/802,664

(22) Filed: Jul. 17, 2015

(65) Prior Publication Data

US 2015/0326669 A1    Nov. 12, 2015

Related U.S. Application Data

(63) Continuation of application No. 13/101,736, filed on May 5, 2011, now Pat. No. 9,118,732.

(51) Int. Cl.
*G06F 11/00* (2006.01)
*H04L 29/08* (2006.01)

(52) U.S. Cl.
CPC ............. *H04L 67/34* (2013.01); *H04L 67/125* (2013.01)

(58) Field of Classification Search
None
See application file for complete search history.

(56) References Cited

U.S. PATENT DOCUMENTS

| | | | |
|---|---|---|---|
| 6,445,917 B1 * | 9/2002 | Bark | H04W 24/00 370/331 |
| 7,817,994 B2 | 10/2010 | Funk et al. | |
| 7,880,394 B2 | 2/2011 | Sibalich et al. | |
| 8,223,744 B2 | 7/2012 | Goldberg et al. | |
| 2004/0028023 A1 | 2/2004 | Mandhyan et al. | |
| 2006/0290519 A1 | 12/2006 | Boate et al. | |
| 2009/0196206 A1 | 8/2009 | Weaver et al. | |
| 2009/0278479 A1 | 11/2009 | Platner et al. | |
| 2010/0117835 A1 | 5/2010 | Nanikashvili | |

(Continued)

FOREIGN PATENT DOCUMENTS

WO    WO 2012/037637    *    3/2012

OTHER PUBLICATIONS

Office Action dated Mar. 21, 2014 for U.S. Appl. No. 13/101,736, 37 pages.

(Continued)

*Primary Examiner* — Edan Orgad
*Assistant Examiner* — Rebecca Song
(74) *Attorney, Agent, or Firm* — Amin, Turocy & Watson, LLP

(57) ABSTRACT

An architecture that can employ a control plane for managing communications with respect to a set of sensors is provided. By utilizing a control plane, a distinction between control messages and data messages can be provided in a standardized way and the set of sensors can benefit from additional functionality and configurability. For example, the control plane can be employed to modify parameters associated with the set of sensors, which can be effectuated in real time and in situ as opposed to at the time of fabrication or deployment. Moreover, such modifications can relate to both the sensing portions of a particular sensor as well as the communication portions of a particular sensor.

20 Claims, 12 Drawing Sheets

(56) References Cited

U.S. PATENT DOCUMENTS

| | | |
|---|---|---|
| 2010/0148940 A1 | 6/2010 | Gelvin et al. |
| 2010/0164296 A1 | 7/2010 | Kurs et al. |
| 2010/0177750 A1 | 7/2010 | Essinger et al. |
| 2010/0201515 A1 | 8/2010 | Fleming |
| 2010/0308967 A1 | 12/2010 | Lauronen |
| 2010/0315242 A1 | 12/2010 | Bullard et al. |
| 2010/0318641 A1* | 12/2010 | Bullard ................ H04L 43/065 709/223 |
| 2011/0125873 A1 | 5/2011 | Pacella et al. |
| 2011/0136433 A1 | 6/2011 | Tsai et al. |
| 2011/0285516 A1 | 11/2011 | Ritter |
| 2011/0286381 A1* | 11/2011 | Ye ......................... H04B 7/155 370/315 |
| 2012/0236778 A1* | 9/2012 | Erdmann ................ H04L 45/22 370/312 |
| 2013/0265919 A1 | 10/2013 | Pochiraju et al. |

OTHER PUBLICATIONS

Final Office Action dated Aug. 28, 2014 for U.S. Appl. No. 13/101,736, 39 pages.
Office Action dated Dec. 31, 2014 for U.S. Appl. No. 13/101,736, 39 pages.

* cited by examiner

CONTROL PLANE FOR SENSOR COMMUNICATION

CROSS-REFERENCE TO RELATED APPLICATIONS

The subject application is a continuation of, and claims priority to, U.S. Patent Application No. 13/101,736 (now U.S. Pat. No. 9,118,732), entitled "CONTROL PLANE FOR SENSOR COMMUNICATION," and filed on May 5, 2011. The entirety of this application is hereby incorporated herein by reference.

TECHNICAL FIELD

The present application relates generally to a communications architecture for sensors that measure a physical quantity, and, more specifically, to utilize a control plane separate from the communication of measured data to customize behavior as well as configure the sensors.

BACKGROUND

Sensors of one type or another have been used to collect information about the physical environment for much of recorded history. For example, early thermostats for measuring temperature and scales for measuring weight date back hundreds of years. In the past, sensors were constructed to measure particular fundamental physical constants. Such sensors were therefore not configurable after fabrication. For example, the particular physical phenomenon to be measured as well as the measurement constant and the precision or range of the measurement were determined at the time of construction, and could not be modified without substantial changes, if feasible at all.

In fact, it is only recently that sensors have gained the ability to be configurable to a degree. In particular, the advent of Micro Electro Mechanical Systems (MEMS), which are manufactured using silicon semiconductor device fabrication technology, which typically include on-board physics and electronics (e.g., amplifiers), have contributed to the ability to configure or program a sensor in recent times. While, most pre-MEMS sensors are preconfigured to measure a single physical phenomenon, and to do so within a preconfigured range, MEMS technology has enabled a wider range of applications. By employing MEMS technology, the actual sensor output is a composite of the output of the MEMS part of the sensor plus the processing that operates according to predetermined constraints, typically programmed with software instructions. Thus, many MEMS sensors are capable of a range of different types or sensitivities of a measurement, even if controlling software is written to take advantage of only a small subset of the possible functionality of the sensor, such as deploying sensors for a particular, predetermined purpose.

Hence, conventional sensor systems do not provide a means to program or recalibrate sensors unless such is provided for at the time the software that utilizes the sensor output is written. Thus, even MEMS sensors of today are not configurable to the extent possible because regardless of the possible functionality of a sensor, once the sensor has been deployed in the field (is placed in situ), very little can be done to control the sensor or the output provided by the sensor. As such, even systems that do allow some degree of remote programming of sensors operate according to a point-to-point communications mechanism and are therefore not effective for programming a large number of sensors in a standard way, and typically such programming must be manually input by humans.

What is needed is a way to provide for real-time, in-situ programming of networked sensors in a way that supports single sensors and large sensor arrays as well as self-calibration/self-organization of the sensor(s).

The above-described deficiencies of sensors and related systems are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

DETAILED DESCRIPTION

Overview

Figure 1:
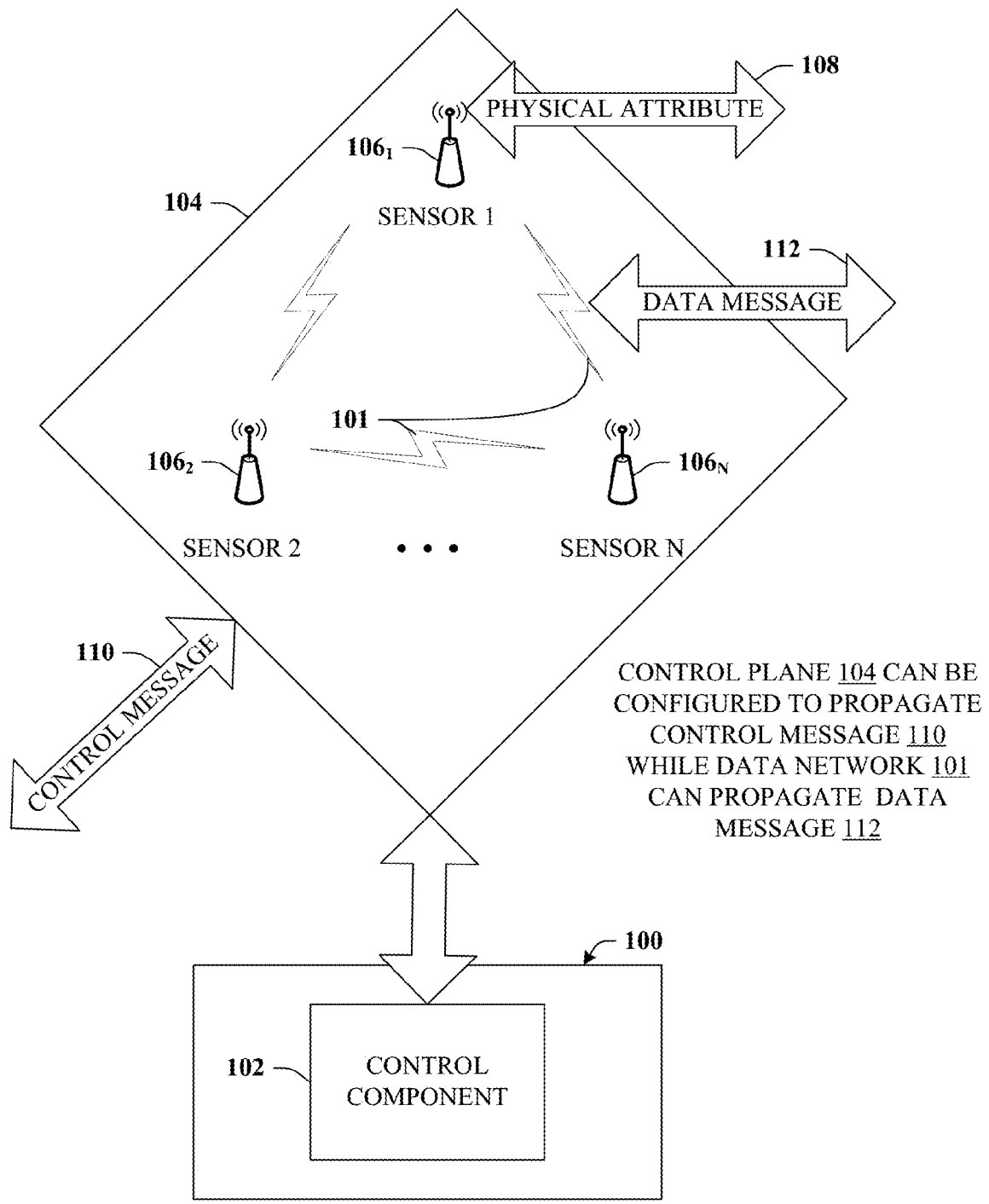
FIG. 1 is a block diagram of a system that can employ a control plane for managing communications with respect to sensors.

Modern networked and/or array sensor can be generally discussed in terms of two sub-components. That is, the sensing component(s) of a sensor and the communications component(s) of a sensor. As such, modern sensors have the capability to operate in a manner similar to that of nodes in a backbone communications network. Enabling such capability can greatly expand the utility and functionality of distributed sensor systems. Today, control planes exist in many forms. Perhaps the most well known is in terms of routing in which the control plane exists as part of the router architecture that is concerned with drawing a network map or managing information and protocols associated with a routing table that defines how to handle incoming packets. For additional examples, a public switched telephone network (PSTN) and a voice-over-IP (VoIP) network can utilize a control plane as well. For instance, the PSTN can employ dial codes and touch-tone decoders to route communications to a particular destination. Likewise, in VoIP networks, the control plane can pass along the control information the telephone at the other end is sending in terms of the network addressing and also in terms of the encoding scheme that is used.

As sensors become more sophisticated and their ability to be "customized" to measure arbitrary quantities improves (e.g., presence/amount of particular chemical compounds or DNA), re-configuration in real-time via a dedicated control plane will become more important. Moreover, separate sensors may be disposed to support array operation, where measurements of designated sensors are combined advantageously to improve detection sensitivity, resolution, or bandwidth by adjustment of gains, synchronization/timing of samples, and rate of acquisition. Such arrays may also have to be adjusted in real-time to provide directional discrimination or detect presence of constantly-changing phenomena or detection targets. Such arrays may involve large groups of networked sensors that are not co-located, but are connected to a common shared network.

By leveraging the concept of a control plane and applying that concept to sensors as well as to sensor arrays, such sensors or sensor arrays can become much more powerful. For example, a control plane for networked sensors can operate as part of the network that sets up and manages communications for the sensors and allows changes to be made, particularly, changes after the sensors are deployed in the field. Thus, by utilizing a control plane in connection with sensors, both the sensing aspects and the communication aspects of the sensors can be modified in situ. Moreover, by employing a control plane in connection with sensors, such modifications can be provided by a central server or based upon the notion of self-organization, where the sensors themselves, either individually or collectively, determine command and control, possibly based upon sensed data or the like. Moreover, programming via the control plane can be conducted over a separate network "channel", either real or virtual. Thus, this separate network channel may operate with a different communication rate, protocol, priority and security level than the "channel" used for communication of measurements and that allows each sensor to be addressed individually for control purposes.

The subject matter disclosed herein, in one aspect thereof, comprises a communications architecture that employs a control plane as a component of an overall sensor-control network architecture. In accordance therewith and to other related ends, the architecture includes a signaling subnetwork that can be configured to provide a control plane for sensors that are configured to measure a physical quantity. The control plane can be thus configured to manage communication associated with a set of sensors in a shared multi-node network environment. In addition, the control plane function is differentiated to allow the sensor to distinguish between control messages and data measurement-related messages. For example, control messages can be utilized in conjunction with the control plane to adjust a parameter associated with a sensor. On the other hand, data messages can be utilized to, e.g., propagate information associated with the physical quantity measured by a particular sensor.

In addition, in a second aspect, a second architecture associated with a sensor that can utilize a control plane is disclosed. In particular, the second architecture can include a sensor. The sensor can include a sensing component that can be configured to measure a physical quantity. Moreover, the sensor can further include a communications component that can be configured to communicate by way of the control plane. Advantageously, the control plane can be configured to support control messages that will define and configure data messages associated with physical quantity measurements.

Control Plane Architecture and Functionality

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, system 100 that can employ a dedicated control plane for providing commands with respect to sensors is depicted. Generally, system 100 can include at least one data network 101 configured to propagate a data message 112 associated with a set of sensors $106_1$-$106_N$, where N can be substantially any positive integer. As used herein, sensors $106_1$-$106_N$ can be referred to, either collectively or individually as sensor(s) 106 and/or set 106. Typically, sensors 106 can be configured to measure a physical quantity or attribute, as depicted in connection with reference numeral 108. For example, sensor 106 can measure a temperature, a barometric pressure, an acceleration, a voltage, a waveform and so forth. As such data message 112 can be configured to include measurement data associated with physical attribute 108.

Moreover, system 100 can also include at least one control component 102 that can be configured to provide dedicated control plane 104 for set of sensors 106. For example, dedicated control plane 104 (or simply control plane 104) can be configured to propagate control message 110. Control message 110 can include instruction data associated with set of sensors 106. Hence, control message 110 can be readily distinguished from data message 112, which relates to measurement data. In more detail, control messages 110 can be configured to convey instructions to or from sensor 106 such as, e.g., instructions directed to changing a setting. Likewise, data message 112 can be configured to convey data associated with physical attribute 108, such as a value or quantity recorded by a sensing mechanism of the sensor. By distinguishing between control messages 110 and data messages 112, control component 102 can therefore adjust settings associated with either the sensing portions of sensor 106 or a feature of communication for sensor 106.

In one or more aspect, control plane 104 can be further configured to operate on a single channel that differs from one or more channel associated with data network 101. Thus, messages transported by control plane 104 can be delivered or received on that single channel. In one or more aspect, control plane 104 can be further configured to operate according to a different network protocol, a different mode of network security, a different communications rate, or a different priority than that for data network 104.

Moreover, control plane 104 can enable independent addressability for all or a portion of sensors included in set of sensors 106. In accordance with one or more aspect, control plane 104 can be compliant with a ZigBee protocol defined according to Institute of Electrical and Electronic Engineers (IEEE) Standards Association 802.15.4. Furthermore, according to one or more aspect, communication associated with set of sensors 106 and managed by control plane 104 can operate according to an Internet Protocol (IP). Thus, for example, communication associated with set of sensors 106 can be packet-based. Moreover, in one or more aspect, communication associated with set of sensors 106 can be wireless.

Still referring to FIG. 1, in one or more aspect control component 102 can be further configured to employ control plane 104 to adjust at least one parameter associated with at least one sensor 106, which is further detailed in connection with FIGS. 2 and 3. Briefly, however, it is appreciated that control component 102 can be configured to adjust the at least one parameter in real time (as opposed to at the time of construction or initial configuration or calibration). Moreover, such adjustment can be performed in connection with sensor 106 that is in situ and/or deployed in the field.

Figure 2:
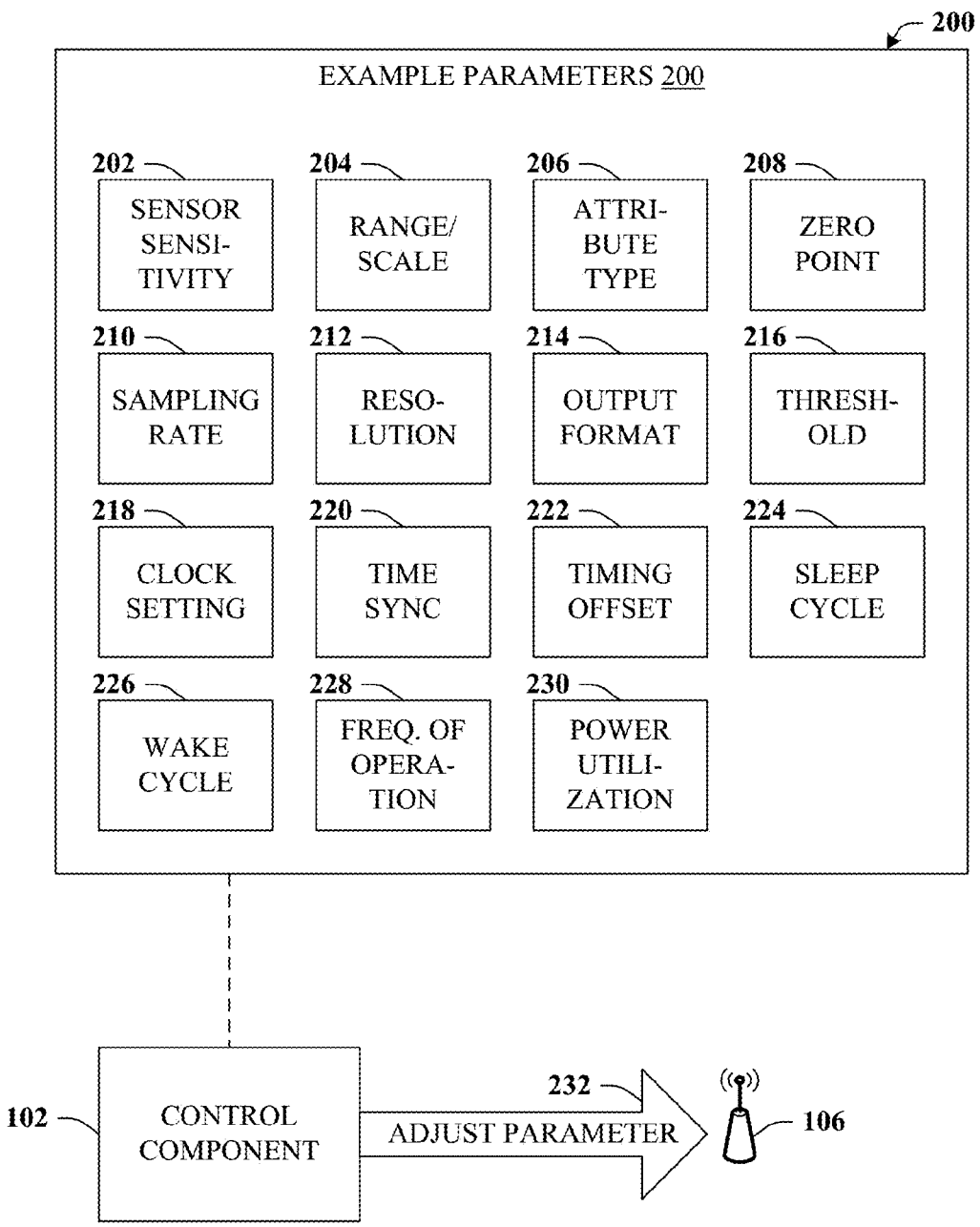
FIG. 2 provides a block diagram of a variety of example parameters that can be adjusted by control component.

Turning now to FIG. 2, a variety of example parameters that can be adjusted by control component 102 are provided. In particular, as a first example, control component 102 can adjust a parameter associated with a sensitivity of the at least one sensor 106, which is represented by reference numeral 202. For example, an accelerometer can be adjusted to gather readings from very slight accelerations to very broad accelerations. Likewise, another example parameter that can be adjusted by control component 102 can relate to a measurement scale or range associated with the at least one sensor 106, which is depicted by reference numeral 204. For instance, the accelerometer can be adjusted to record measurements associated with acceleration from between ±2.00 g or from between 4.0 g and 8.0 g and so forth.

Continuing with additional examples, the at least one parameter can be associated with a physical attribute (e.g., physical attribute 108) to be measured by the at least one sensor 106, which is depicted by reference numeral 206. For example, in cases in which sensor 106 has the capability to measure multiple physical attributes or quantities, an adjustment can be provided by control component 102 to set the particular physical attribute to be evaluated. Moreover, reference numeral 208 relates to a zero point, which can serve as yet another example of the at least one parameter that can be adjusted by control component 102. For instance, control component 102 can signal sensor 106 to recalibrate to a particular reference or scale setting.

In addition, reference numerals 210-216 refer respectively to sampling rate 210 (e.g., how often to evaluate physical attribute 108 or a period between evaluation samples), resolution 212 (e.g., a precision for the evaluation of physical attribute 108), output format 214 (e.g., a precision or other format associated with the format of sensor 106 output), and threshold 216 (e.g., a value associated with physical attribute 108 in which further action or additional routines are employed). All or a portion of these can be associated with or can represent the at least one parameter that can be adjusted by control component 102.

Furthermore, the at least one parameter that can be adjusted by control component 102 can relate to clock setting 218 (e.g., a current time) associated with the at least one sensor 106; time synchronization 220 (e.g., a clock setting relative to other clocks) associated with the at least one sensor 106 or in connection with other sensors associated with control plane 104; timing offset 220 (e.g., a sampling time that is offset from that for other sensors) associated with the at least one sensor 106 or in connection with other sensors associated with control plane 104; sleep cycle 224 (e.g., when to power down) of the at least one sensor 106; wake cycle 226 (e.g., when to power on) of the at least one sensor 106; frequency of operation 228; or power utilization 230 setting (e.g., power consumption) associated with the at least one sensor 106.

It is understood that reference numerals 202-230 are presented as concrete examples yet not necessarily limitation on the various parameters that can be adjusted by control component 102. Rather, it is envisioned that control component 102 can utilize control plane 104 to adjust other parameters as well, which is depicted by reference numeral 232 denoting "adjust parameter". Moreover, it is further understood that reference numerals 202-230 can relate to features associated with both actual sensing as well as communication, and can further be adjusted in real time and for sensors 106 that are in situ.

Figure 3:
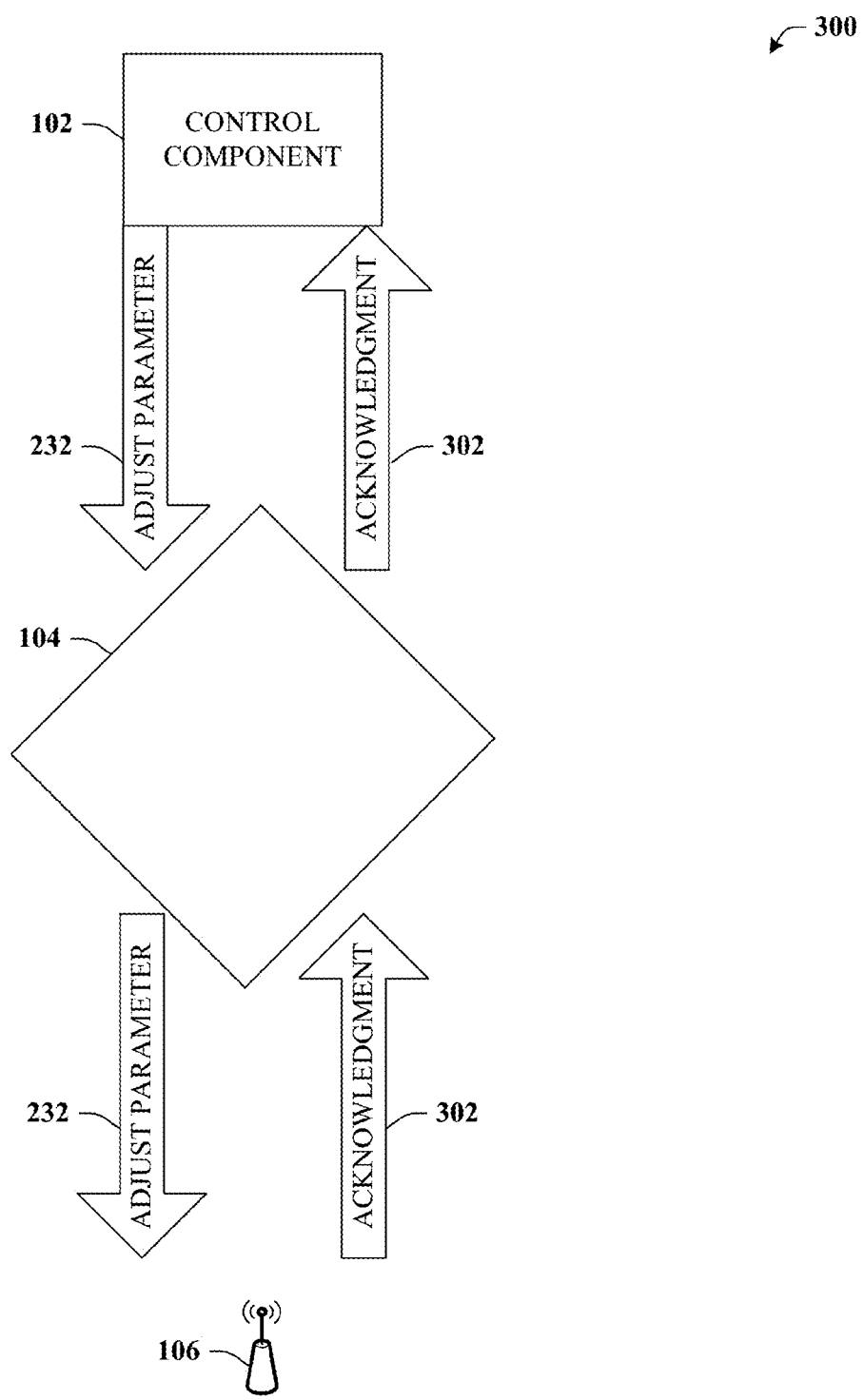
FIG. 3 provides a block diagram of a system that can provide adjustments to a sensor and receive acknowledgements relating to the adjustment.

Referring now to FIG. 3, system 300 that can provide adjustments to a sensor and receive acknowledgements relating to the adjustment is illustrated. In particular, system 300 can include control component 102 that, as detailed supra, can be configured to provide control plane 104 for a set of sensors 106, wherein control plane 104 can be configured to manage communication associated with the set of sensors 106. Moreover, as introduced above, control component 102 can be configured to employ control plane 104 to adjust at least one parameter associated with the at least one sensor 106. Such is again depicted by reference numeral 232, which can be propagated from control component 102 along control plane 104 to sensor 106.

In addition, in one or more aspect, control component 102 can be further configured to employ control plane 104 to receive acknowledgment 302 from the at least one sensor 106. For example, acknowledgment 302 can indicate the at least one parameter was adjusted as instructed, or conversely indicate the at least one parameter was not adjusted as instructed, possibly with error codes or addition information. It is appreciated that in terms of control plane 104 both instructions related to adjustment of the parameter and acknowledgment 302 can be associated with control messages 110, which can be configured differently than data messages 112 employed to propagate data associated with sensor 106 readings or the like.

Figure 4:
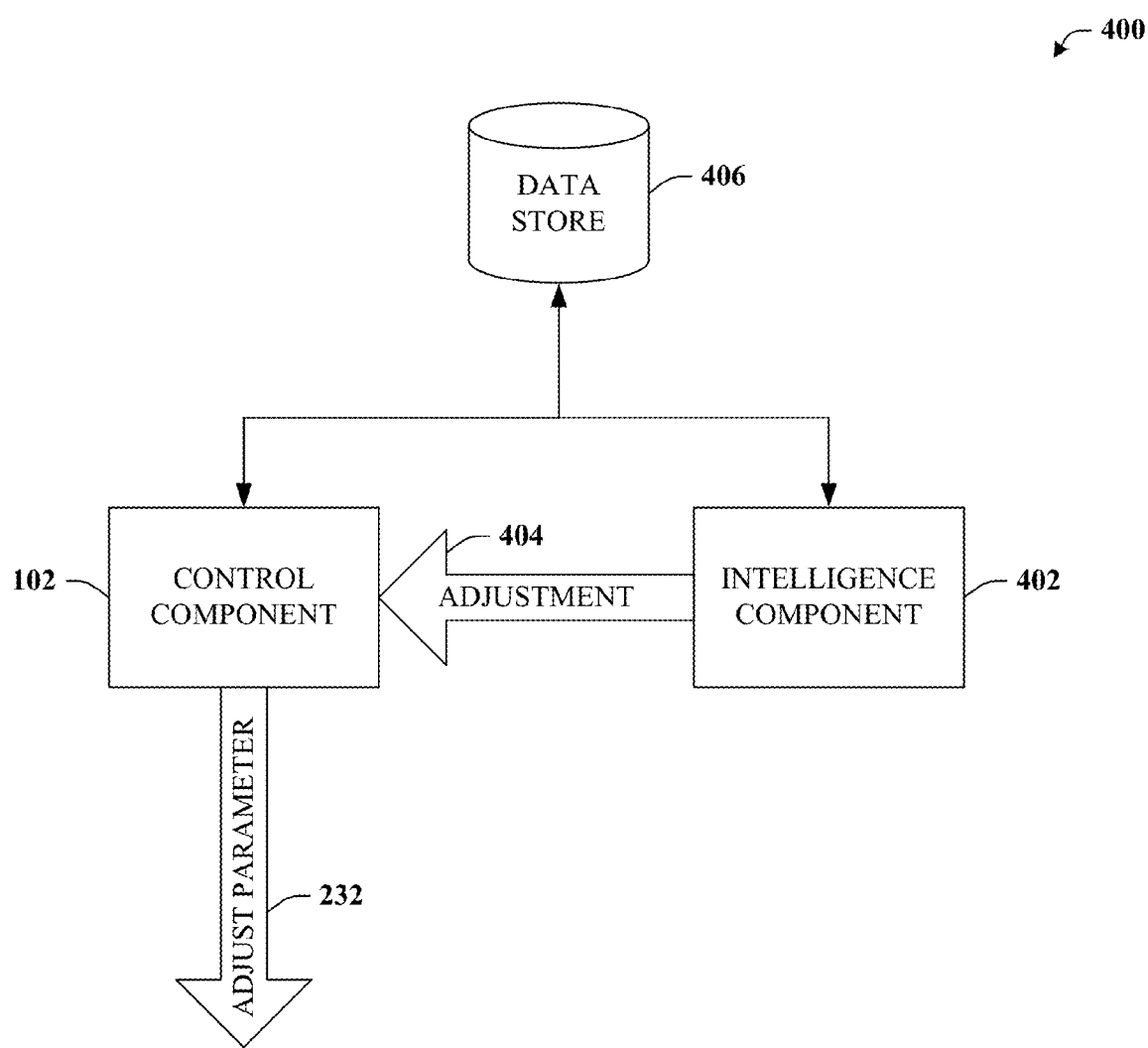
FIG. 4 illustrates a block diagram of a system that can perform or aid with various intelligent determinations or inferences.

With reference now to FIG. 4, system 400 that can perform or aid with various intelligent determinations or inferences is illustrated. Generally, system 400 can include control component 102 that can provide control plane 104 configured to manage communication associated with a set of sensors 106 as substantially described supra. As provided above, control component 102 can employ control plane 104 to adjust at least one parameter (adjust parameter 232) associated with the set of sensors 106.

In addition, system 400 can also include intelligence component 402 that can provide for or aid in various inferences or determinations. In particular, in one or more aspect, intelligence component 402 can be configured to dynamically infer adjustment 404 associated with the at least one parameter. Put another way, control messages 110 that relate to adjust parameter 232 and provided to a sensor 106 (e.g., to instruct sensor 106 to adjust a particular parameter) can be based upon an intelligent inference determined by intelligence component 402 and provided to control component 102 in the form of adjustment 404. In one or more aspect, adjustment 404 can relate to at least one of a communication channel utilized by the set of sensors 106, an allocation of spectrum for the set of sensors 106, or a sampling rate or other parameter associated with the set of sensors 106. Thus, it is appreciated that by utilizing such intelligent determinations the set of sensors can attain a degree of self-organization and/or self-calibration.

As such, intelligence component 402 can be remote from control component 102 in whole or in part. Additionally or alternatively, all or portions of intelligence component 402 can be included in one or more components described herein, such as control component 102. Thus, intelligence component 402 can reside in whole or in part within system 100 or within components described therein. Moreover, intelligence component 402 will typically have access to all or portions of data sets described herein, such as data store 406. As used herein, data store 406 is intended to be a repository of all or portions of data, data sets, or information described herein or otherwise suitable for use with the described subject matter. Data store 406 can be centralized, either remotely or locally cached, or distributed, potentially across multiple devices and/or schemas. Furthermore, data store 406 can be embodied as substantially any type of memory, including but not limited to volatile or non-volatile, sequential access, structured access, or random access, solid state, and so on. It should be understood that all or portions of data store 406 can be included in systems 100 or other suitable components described herein, or can reside in part or entirely remotely.

In more detail, in order to provide for or aid in various inferences, intelligence component 402 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5A:
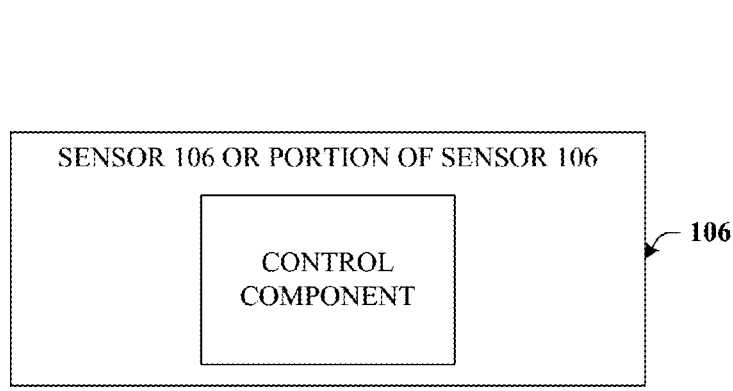
FIG. 5A depicts a block diagram of a system is configured such that all or a portion of the control component can be included in one or more sensor from the set of sensors.
Figure 5B:
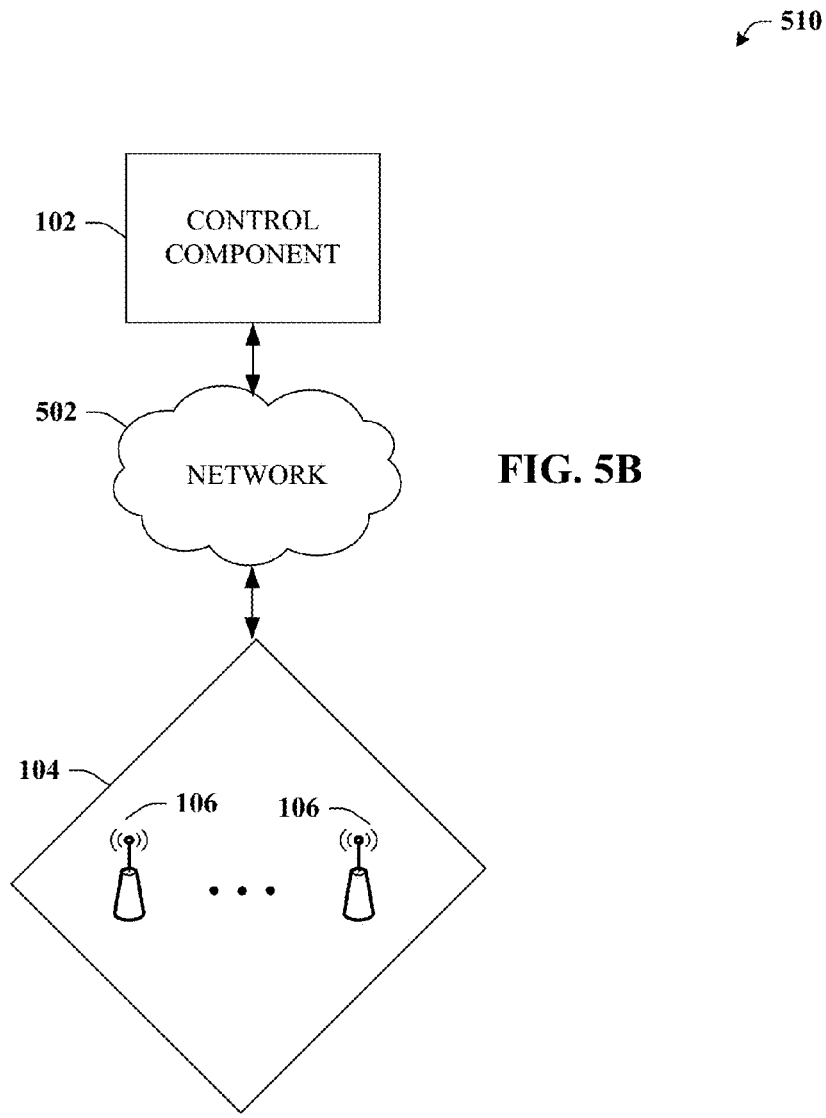
FIG. 5B illustrates a block diagram of a system in which all or a portion of the components described herein can be remote from one or more of the set of sensors.

With reference now to FIGS. 5A-B, various design configurations are depicted. In particular, FIG. 5A is configured such that all or a portion of control component 102 can be included in a sensor 106 from the set of sensors 106. Likewise, FIG. 5B relates to system 510 in which all or a portion of control component 102 can be remote from set of sensors 106. Thus, control component 102 can be communicatively coupled to control plane 104 and/or set of sensors 106 by way of network 502, thus operating as a central management mechanism. It is appreciated that network 502 can be substantially any suitable network such as a wide area network (WAN), a local area network (LAN), or another suitable type of communications network. It is further appreciated that control plane 104 can be included in, either in whole or in part, in network 502.

Figure 6:
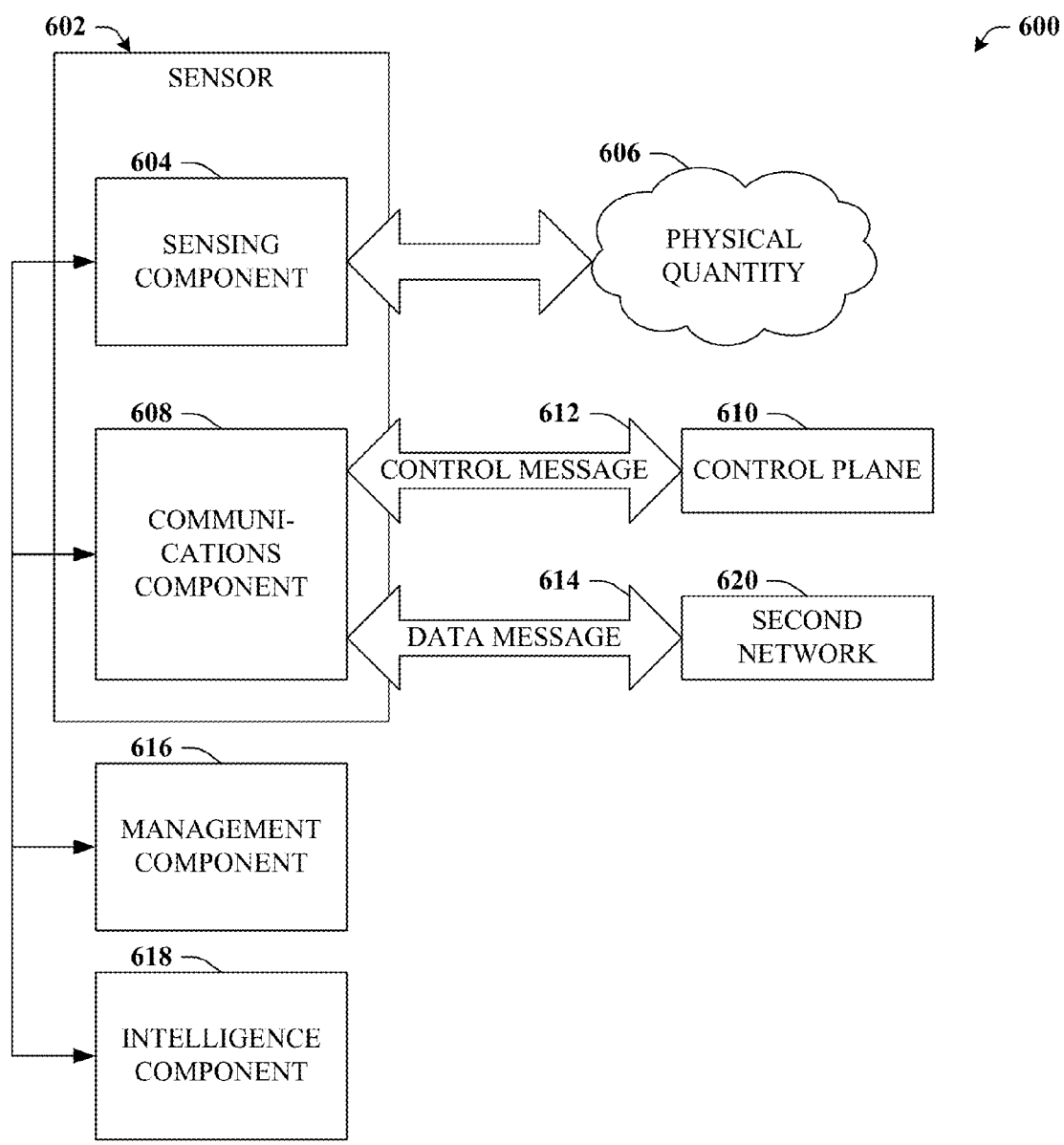
FIG. 6 provides a block diagram of a system that can employ a control plane to manage communication for one or more sensor.

Turning now to FIG. 6, system 600 that can employ a dedicated control plane to propagate control messages for one or more sensor is provided. Generally, system 600 can include sensor 602. Sensor 602 can include sensing component 604 that can be configured to measure physical quantity 606 extant in a local environment such as a temperature, an acceleration, a voltage, or the like. In addition, sensor 602 can further include communications component 608 that can be configured to communicate by way of control plane 610 or second network 620. Control plane 610 can be configured to support control messages 612 that can be configured to convey instructions. On the other hand, second network 620 can be configured to transport data messages 614 that can be configured to convey data associated with physical quantity 606. By employing control plane 610, sensor 602 can be readily calibrated to operate in accordance with a different set of parameters than when originally deployed. In other words, sensor 602 can be fully configurable in real time and in situ. Moreover, sensor 602 as well as multiple other sensors can be independently addressable by way of control plane 610

In one or more aspect, sensor 602 can further include management component 616. Management component 616 can be configured to adjust sensor 602, and in particular, adjust features relating to sensing component 604 or communications component 608. Such adjustments can be based upon, e.g., at least one instruction included in control message 612 received by way of control plane 610. Furthermore, in one or more aspect, sensor 602 can further include intelligence component 618 that can be configured to dynamically infer an adjustment to sensor 602. Hence, intelligence component 618 can provide for or aid with various intelligent determinations or inferences similar to that described in connection with intelligence component 402 of FIG. 4.

Figure 7:
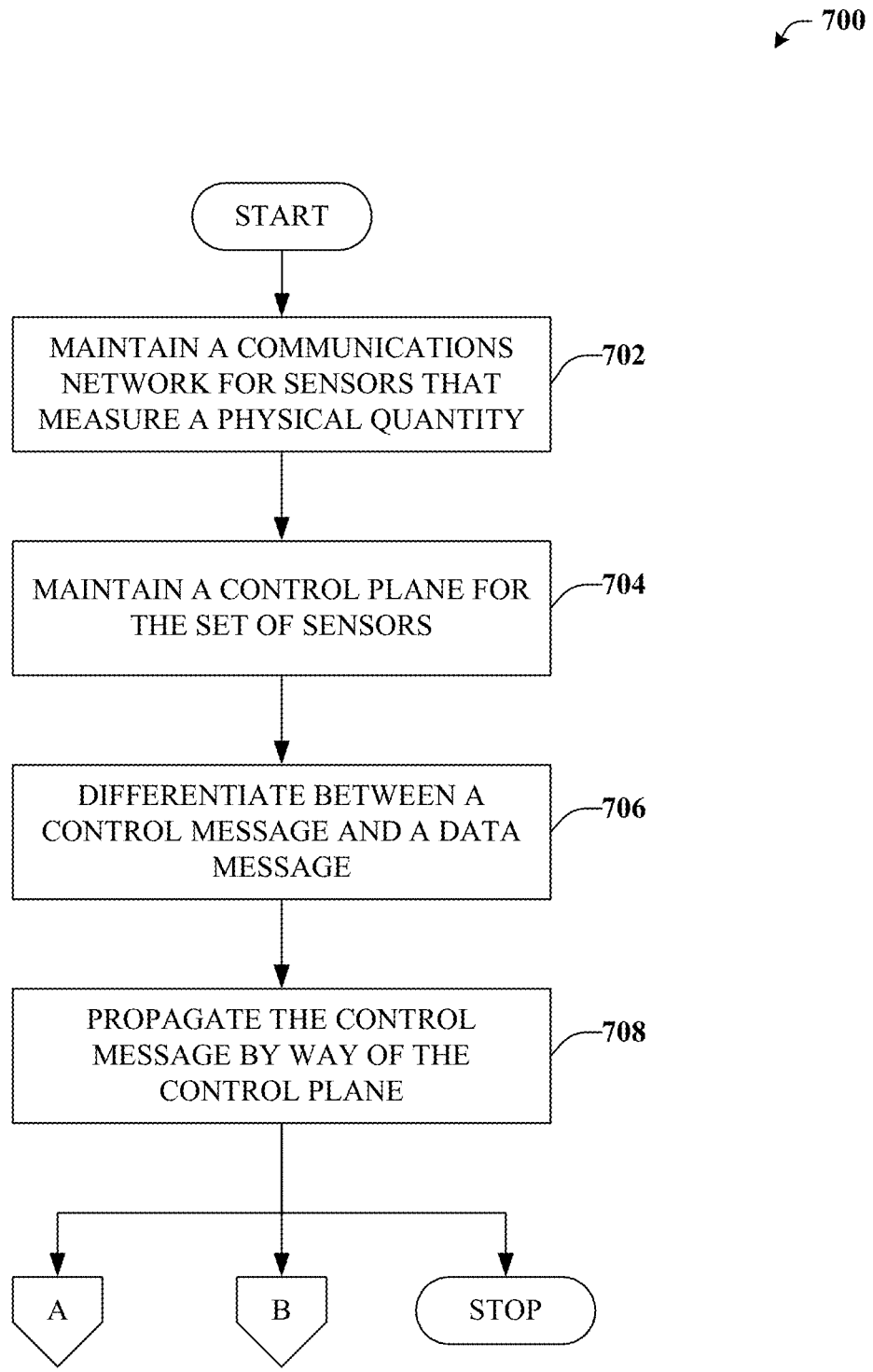
FIG. 7 depicts an exemplary flow chart of procedures defining a method for utilizing a control plane in connection with sensor communication.
Figure 8:
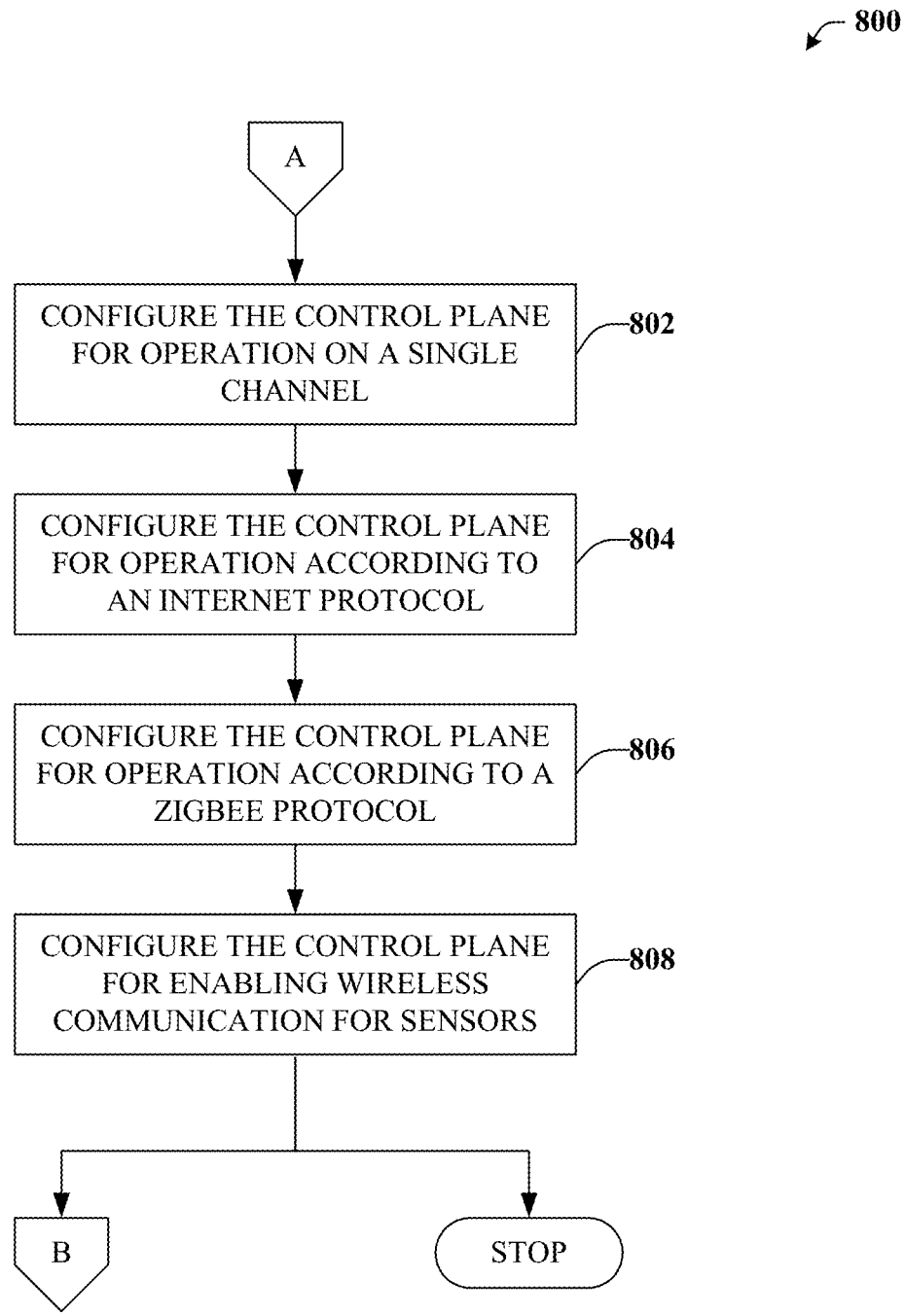
FIG. 8 is an exemplary flow chart of procedures that define a method for further configuring the control plane.
Figure 9:
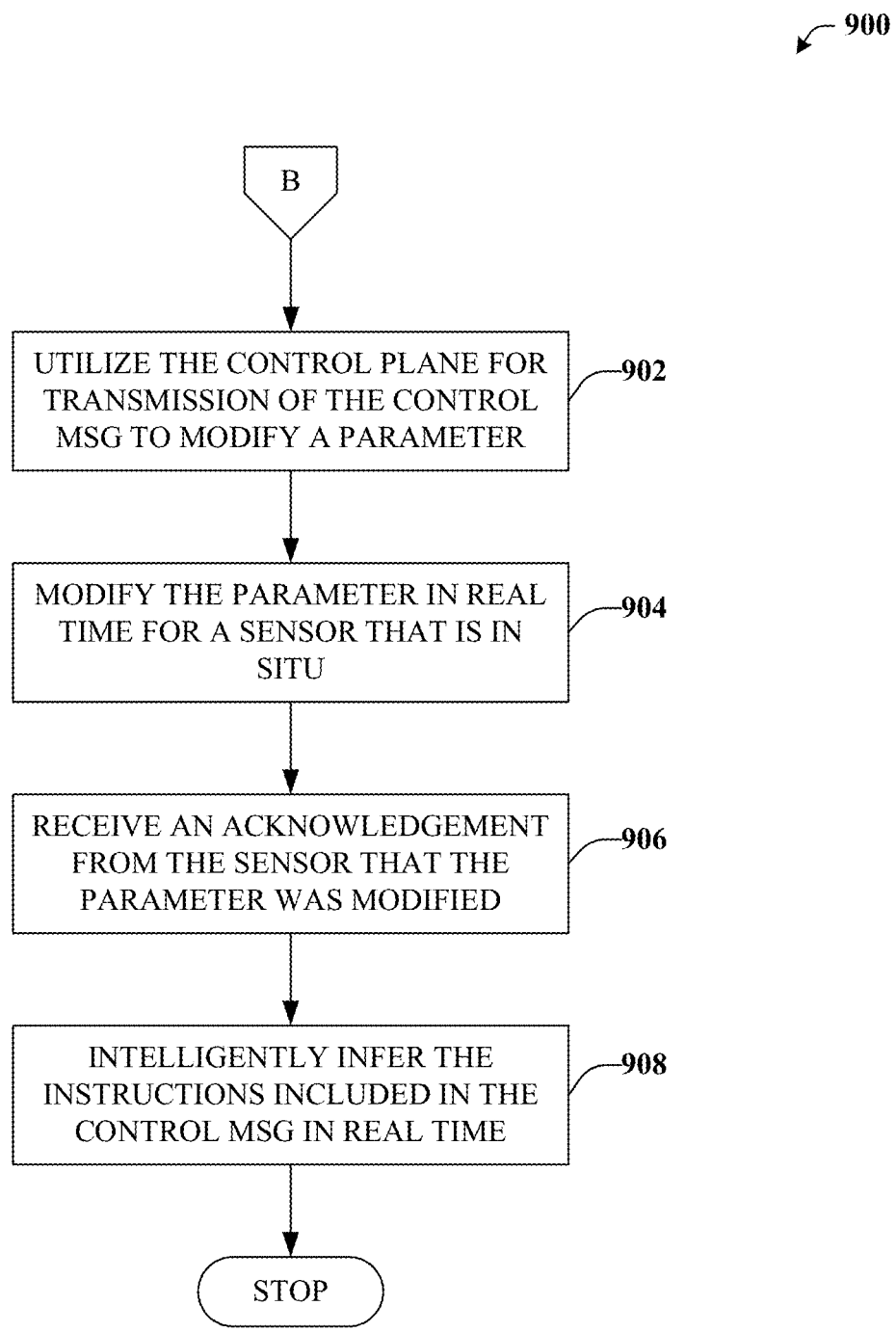
FIG. 9 depicts an exemplary flow chart of procedures defining a method for providing additional features or aspects in connection with utilizing a control plane for sensor communication.

FIGS. 7-9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 for utilizing a control plane in connection with sensor communication depicted. Generally, at reference numeral 702, a communications network for a set of sensors configured to measure a physical quantity can be maintained.

Moreover, at reference numeral 704, a dedicated and independent control plane for the set of sensors can be maintained as well. For example, the control plane can be configured for maintaining communications for control messages with respect to the set of sensors. In one or more aspect, a computer-readable storage medium (e.g., non-transitory medium) can be employed for establishing the control plane for a set of sensors configured to measure a physical quantity. Moreover, at reference numeral 706, configured processor can be employed for differentiating between (1) a control message including at least one sensor command and (2) a data message including sensor data, e.g., data associated with the physical quantity.

Thus, at reference numeral 708, the control message can be propagated by way of the control plane. Likewise, the data message can be propagated by way of the communications network. Moreover, it is understood that by employing a control plane for managing and/or maintaining control message communications for the set of sensors, such sensors can be readily calibrated to operate in accordance with a different set of parameters than when originally deployed. In other words, the set of sensors can be independently addressable and fully configurable in real time and in situ.

Turning now to FIG. 8, exemplary method 800 for further configuring the control plane is illustrated. At reference numeral 802, the control plane established at reference numeral 702 of FIG. 7 can be further configured for operating on a single channel. Additionally or alternatively, at reference numeral 804, the control plane can be further configured for operating according to a ZigBee protocol (e.g., IEEE 802.15.4).

Furthermore, at reference numeral 806, the control plane can be further configured for operating according to an Internet Protocol such that information is propagated in well-defined packets or datagrams. Moreover, at reference numeral 808, the control plane can be further configured for enabling wireless communication with respect to the set of sensors.

With reference now FIG. 9, exemplary method 900 for providing additional features or aspects in connection with utilizing a control plane for sensor communication is depicted. As detailed supra, the control plane can be configured to differentiate between control messages and data messages. As such, at reference numeral 902, the control plane can be utilized for transmission of a control message instructing at least one sensor from the set of sensors to modify at least one parameter associated with the at least one sensor.

In accordance therewith, at reference numeral 904, the at least one parameter can be modified in real time, wherein the at least one parameter is associated with a sensor that has been deployed in the field and/or is in situ. Furthermore, at reference numeral 906, an acknowledgement can be received from the at least one sensor indicating that the at least one parameter was modified according to instructions included in the control message. Otherwise, the acknowledgement can alternatively indicate an error condition or that the at least one parameter was not modified according to instruction.

Moreover, at reference numeral 908, the instruction(s) included in the control message can be intelligently inferred rather than being determined and input by a human actor. Advantageously, such intelligent inferences can be provided in real time and can be based upon conditions associated with the set of sensors or a physical environment of the set of sensors.

Figure 10:
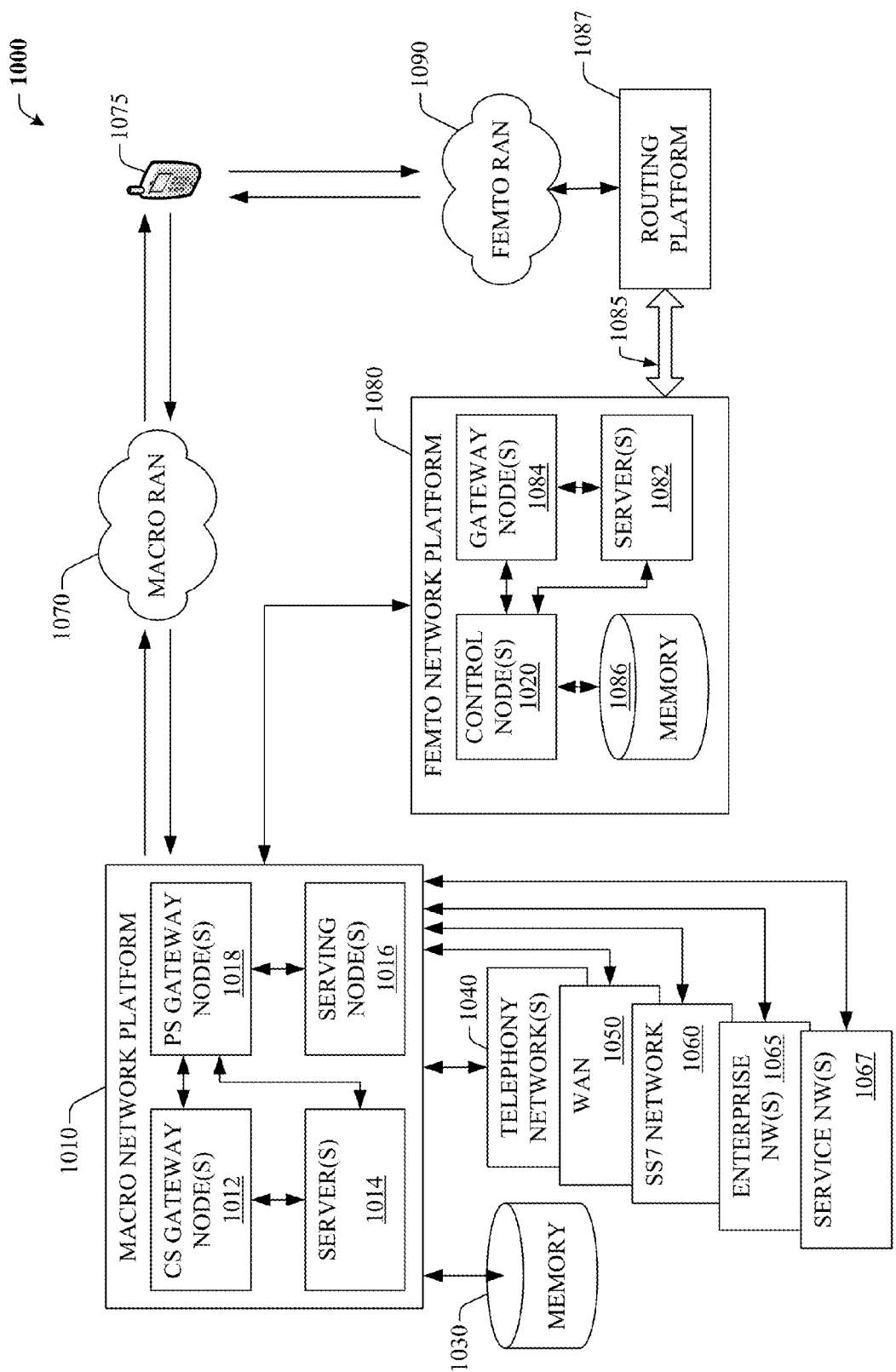
FIG. 10 illustrates a first example of a wireless communications environment with associated components that can be operable to a portion of the disclosed subject matter.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 4G, 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090, linked to the femto network platform 1080 through a routing platform 1087 via backhaul pipe(s) 1085, wherein backhaul pipe(s) are substantially the same a backhaul link 1151 below. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node (s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/ authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration (e.g., devices served through femto RAN 1090; access control lists, or white lists); service policies and specifications; privacy policies; add-on features; and so forth.

It is noted that femto network platform 1080 and macro network platform 1010 can be functionally connected through one or more reference link(s) or reference interface (s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
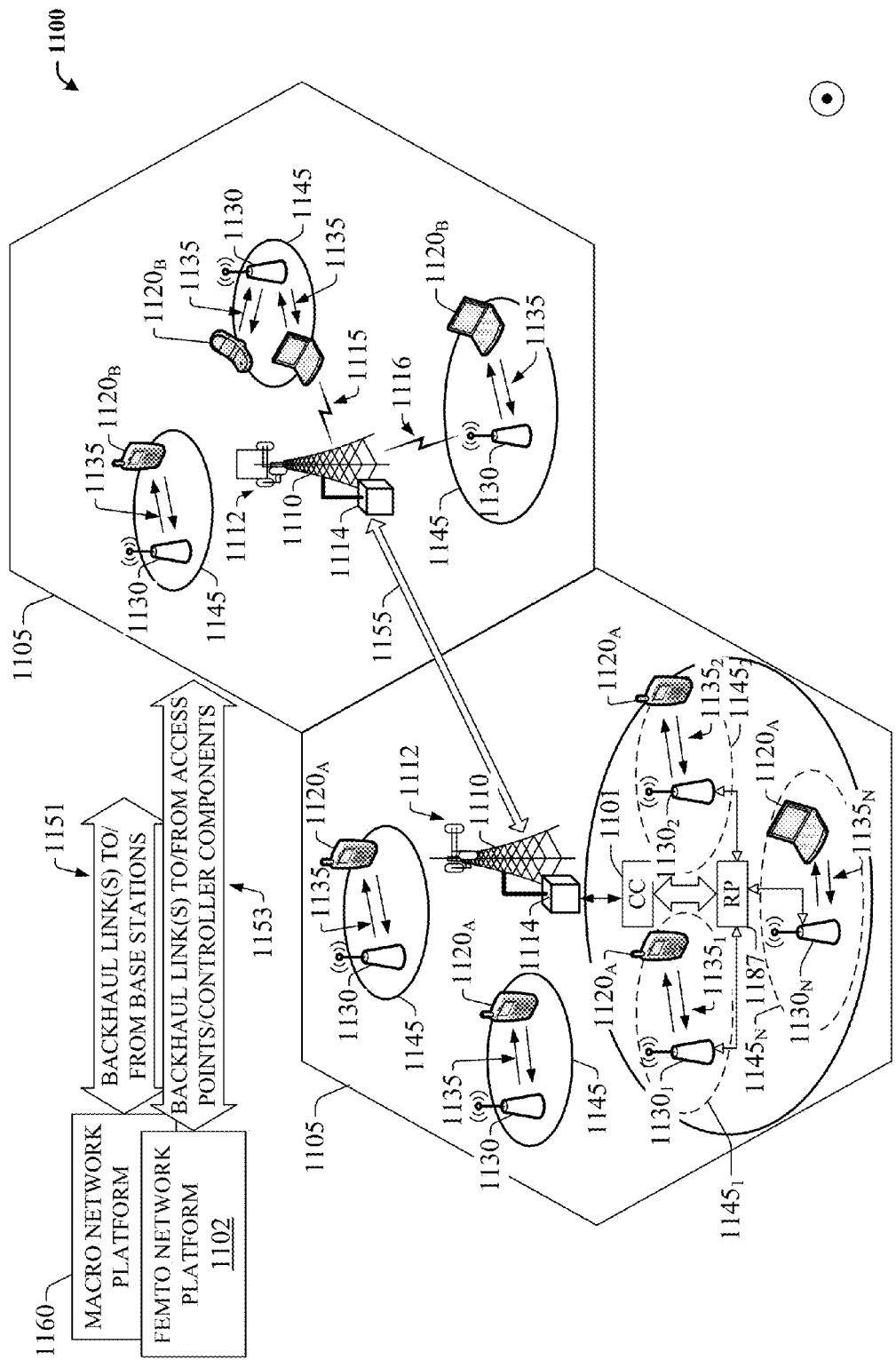
FIG. 11 illustrates a second example of a wireless communications environment with associated components that can be operable to a portion of the disclosed subject matter.

FIG. 11 illustrates a wireless environment that includes macro cells and femtocells for wireless coverage in accordance with aspects described herein. In wireless environment 1150, two areas 1105 represent "macro" cell coverage; each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE 1120$_A$, 1120$_B$, in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE 1120$_A$, 1120$_E$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112 (e.g., smart antennas, microwave antennas, satellite dish(es) . . . ) that can serve one or more sectors within a macro cell 1105.

It is noted that a set of radio network control node(s), which can be a part of macro network platform; a set of base stations (e.g., Node B 1110) that serve a set of macro cells 1105; electronics, circuitry or components associated with the base stations in the set of base stations; a set of respective OTA wireless links (e.g., links 1115 or 1116) operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP) 1187, which in turn can be connect to a controller component (CC) 1101. Typically, the information from UEs $1120_A$ can be routed by the RP 112, for example, internally, to another UE $1120_A$ connected to a disparate femto AP connected to the RP 1187, or, externally, to the femto network platform 1102 via the CC 1101, as discussed in detail supra.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $11^4$-$10^7$ femto APs 1130 per base station 1110. According to an aspect, a set of femto access points $1130_1$-$1130_N$, with N a natural number, can be functionally connected to a routing platform 1187, which can be functionally coupled to a controller component 1101. The controller component 1101 can be operationally linked to the femto network platform 330 by employing backhaul link(s) 1153. Accordingly, UE $1120_A$ connected to femto APs $1130_1$-$1130_N$ can communicate internally within the femto enterprise via the routing platform (RP) 1187 and/or can also communicate with the femto network platform 1102 via the RP 1187, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

With respect to FIG. 11, in example embodiment 1100, femtocell AP 1110 can receive and transmit signal(s) (e.g., traffic and control signals) from and to wireless devices, access terminals, wireless ports and routers, etc., through a set of antennas $1169_1$-$1169_N$. It should be appreciated that while antennas $1169_1$-$1169_N$ are a part of communication platform 1125, which comprises electronic components and associated circuitry that provides for processing and manipulating of received signal(s) (e.g., a packet flow) and signal(s) (e.g., a broadcast control channel) to be transmitted. In an aspect, communication platform 1125 includes a transmitter/receiver (e.g., a transceiver) 1166 that can convert signal(s) from analog format to digital format upon reception, and from digital format to analog format upon transmission. In addition, receiver/transmitter 1166 can divide a single data stream into multiple, parallel data streams, or perform the reciprocal operation. Coupled to transceiver 1166 is a multiplexer/demultiplexer 1167 that facilitates manipulation of signal in time and frequency space. Electronic component 1167 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1167 can scramble and spread information (e.g., codes) according to substantially any code known in the art; e.g., Hadamard-Walsh codes, Baker codes, Kasami codes, polyphase codes, and so on. A modulator/demodulator 1168 is also a part of operational group 1125, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1110 also includes a processor 1145 configured to confer functionality, at least partially, to substantially any electronic component in the femto access point 1110, in accordance with aspects of the subject innovation. In particular, processor 1145 can facilitate FAP 1110 to implement configuration instructions received through communication platform 1125, which can include storing data in memory 1155. In addition, processor 1145 facilitates FAP 1110 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1145 can manipulate antennas $1169_1$-$1169_N$ to facilitate beamforming or selective radiation pattern formation, which can benefit specific locations (e.g., basement, home office . . . ) covered by FAP; and exploit substantially any other advantages associated with smart-antenna technology. Memory 1155 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1155 can store configuration information such as schedules and policies; FAP address(es) or geographical indicator(s); access lists (e.g., white lists); license(s) for utilization of add-features for FAP 1110, and so forth.

In embodiment 1100, processor 1145 is coupled to the memory 1155 in order to store and retrieve information necessary to operate and/or confer functionality to communication platform 1125, broadband network interface 1135 (e.g., a broadband modem), and other operational components (e.g., multimode chipset(s), power supply sources . . . ; not shown) that support femto access point 1110. In addition, it is to be noted that the various aspects disclosed in the subject specification can also be implemented through (i) program modules stored in a computer-readable storage medium or memory (e.g., memory 1186 or memory 1155) and executed by a processor (e.g., processor 1145), or (ii) other combination(s) of hardware and software, or hardware and firmware.

Figure 12:
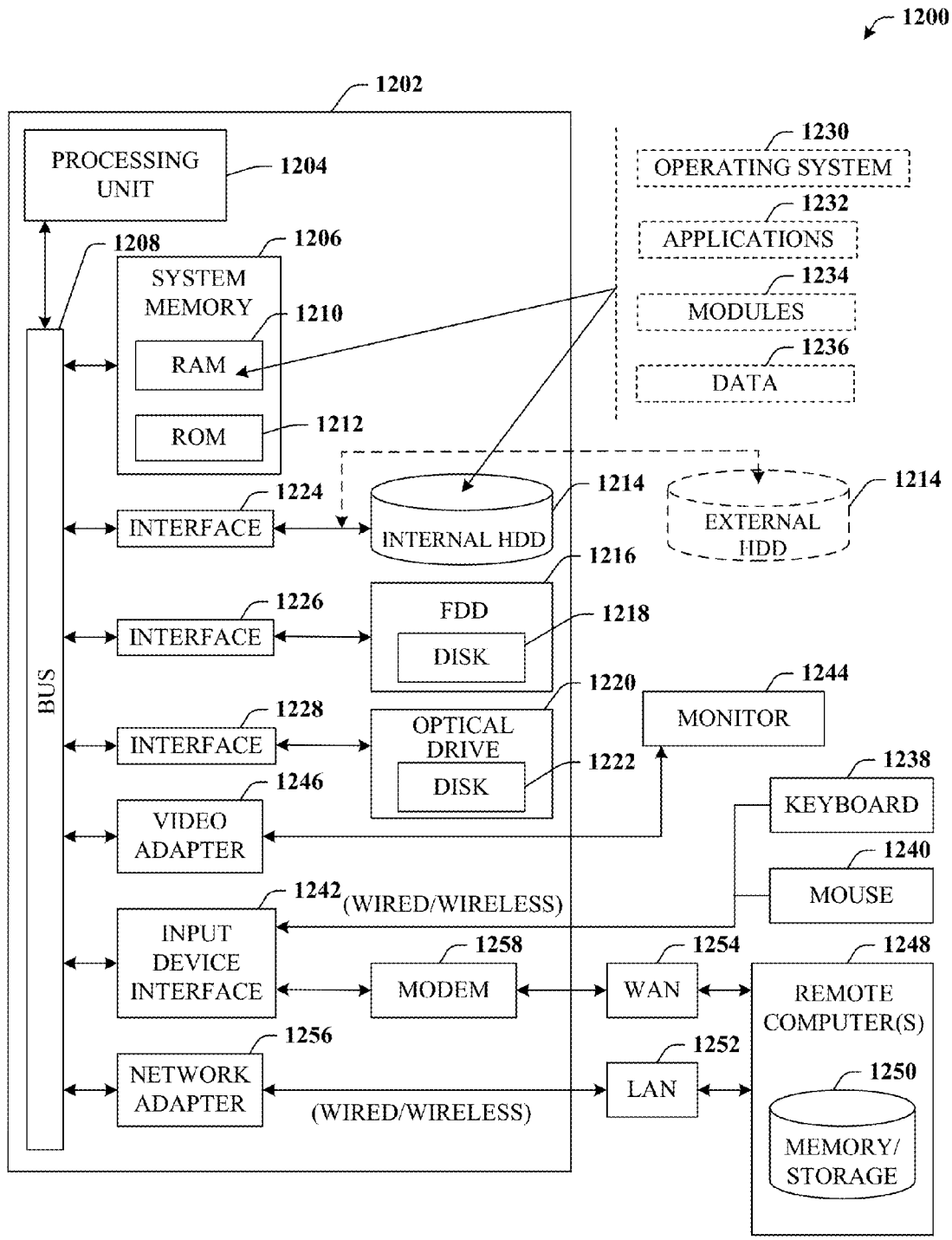
FIG. 12 illustrates a block diagram of an example computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 12 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media As used herein, the terms "infer" or "inference" generally connote the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A sensor device, comprising:
a communication circuit that communicates with devices of a sensor network;
a sensing circuit that measures a physical quantity according to a parameter;
a processor; and
a memory that stores executable instructions that, when executed by the processor, facilitate performance of operations, comprising:
receiving sensed data indicative of a measurement of the physical quantity;
transmitting a data message comprising first data indicative of the sensed data that is measured according to the parameter, wherein the data message is transmitted via a data plane of the sensor network that communicatively couples sensor devices one of which is the sensor device;
receiving a control message comprising second data indicative of an instruction to adjust the parameter used to measure the physical quantity, wherein the control message is received via a control plane of the sensor network; and
adjusting the parameter used to measure the physical quantity according to the instruction.

2. The sensor device of claim 1, wherein the parameter is a sensitivity parameter that determines a sensitivity by which the physical quantity is measured.

3. The sensor device of claim 1, wherein the parameter is a scale parameter that determines a scale by which the the physical quantity is measured.

4. The sensor device of claim 1, wherein the parameter is a range parameter that determines range values by which the physical quantity is measured.

5. The sensor device of claim 1, wherein the parameter is a first parameter, the physical quantity is a first physical quantity, and the instruction relates to measuring the first physical quantity according to the first parameter and to measuring a second physical quantity according to a second parameter.

6. The sensor device of claim 1, wherein the instruction relates to a change of the physical quantity to be measured.

7. The sensor device of claim 1, wherein the sensor device is a first sensor device, the physical quantity is a first physical quantity, and the transmitting the data message further comprises:
receiving the data message, from a second sensor device of the sensor devices, comprising third data indicative of a second physical quantity received from the second sensor device; and
forwarding the data message via the data plane.

8. The sensor device of claim 1, wherein the instruction is a first instruction, the parameter is a first parameter, the sensor device is a first sensor device, and the receiving the control message further comprises:
receiving the control message comprising fourth data indicative of a second instruction to adjust a second parameter associated with a second sensor device of the sensor devices; and
forwarding the control message to the second sensor device via the control plane.

9. A system, comprising:
a processor; and
a memory that stores executable instructions that, when executed by the processor, facilitate performance of operations, comprising:
receiving, via a data plane of a sensor network that communicatively couples sensor devices and the system, a data message from a sensor device of the sensor devices, wherein the data message comprises first data indicative of a measurement of a physical quantity that is measured by the sensor device according to a parameter;
determining an adjustment to the parameter used to measure the physical quantity; and
transmitting, via a control plane of the sensor network, a control message to the sensor device, wherein the control message comprises second data indicative of an instruction adjust the parameter used to measure the physical quantity in accordance with the determining.

10. The system of claim 9, wherein the parameter determines a sensitivity by which the physical quantity is measured.

11. The system of claim 9, wherein the parameter determines a scale of the physical quantity being measured.

12. The system of claim 9, wherein the parameter determines a range of values of the physical quantity being measured.

13. The system of claim 9, wherein the parameter is a first parameter, the physical quantity is a first physical quantity, and the adjustment relates to measuring the first physical quantity according to the first parameter and to measuring a second physical quantity according to a second parameter.

14. The system of claim 9, wherein the adjustment adjusts the physical quantity to be measured by the sensor device.

15. The system of claim 9, wherein the operations further comprise determining an address of the sensor device, and wherein the address represents a group sensor network address that identifies a group of sensor devices of the sensor devices for group communication.

16. A method, comprising:
transforming, by a sensor device comprising a processor, a measurement associated with a physical quantity to measurement data, wherein the measurement is according to a parameter used to measure the physical quantity;
transmitting, by the sensor device, the measurement data via a data plane of a sensor network that communicatively couples sensor devices, wherein one of the sensor devices is the sensor device;
receiving, by the sensor device, control data via a control plane of the sensor network, wherein the control data is indicative of an instruction to change the parameter used to measure the physical quantity; and changing, by the sensor device, the parameter used to measure the physical quantity according to the instruction.

17. The method of claim 16, further comprising:
receiving, by the sensor device, second measurement data from a second sensor device of the sensor devices; and
forwarding, by the sensor device, the second measurement data via the data plane.

18. The method of claim 16, further comprising:
receiving, by the sensor device, second control data indicative of a second instruction to adjust a second parameter associated with a second sensor device of the sensor devices; and
forwarding, by the sensor device, the second control data to the second sensor device via the control plane.

19. The method of claim 16, wherein the changing the parameter comprises changing the parameter associated with a way the sensor device performs measurements.

20. The method of claim 16, wherein the parameter determines a sensitivity by which the physical quantity is measured.

* * * * *